United States Patent [19]

Leiber

[11] Patent Number: 4,715,661
[45] Date of Patent: Dec. 29, 1987

[54] HYDRAULIC BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 818,522

[22] Filed: Jan. 13, 1986

[30] Foreign Application Priority Data

Mar. 1, 1985 [DE] Fed. Rep. of Germany ....... 3507186

[51] Int. Cl.$^4$ ............................................. B60T 13/14
[52] U.S. Cl. ......................................... 303/10; 60/545;
60/581; 188/345; 188/355; 303/52; 303/114;
303/119; 303/DIG. 4
[58] Field of Search ............... 188/345, 181, 355, 358,
188/359, 360; 303/52, 56, 54, 53, 6 R, 6 A, 114,
119, 92, 10–12, 116, 117, 113, 63, DIG. 1–DIG.
4; 60/581, 582, 545, 547.1, 549, 550, 552, 562

[56] References Cited

U.S. PATENT DOCUMENTS

| 3,800,540 | 4/1974 | Papiau | 60/581 |
| 3,914,943 | 10/1975 | Lewis | 60/585 |
| 4,090,533 | 5/1978 | Harries | 137/627.5 |
| 4,231,620 | 11/1980 | Leiber | 303/119 |
| 4,475,338 | 10/1984 | Gaiser | 60/581 X |
| 4,478,461 | 10/1984 | Leiber | 303/92 |
| 4,489,555 | 12/1984 | Leiber | 303/92 X |

FOREIGN PATENT DOCUMENTS 2136899 9/1984 United Kingdom ............... 303/114

Primary Examiner—Douglas C. Butler
Attorney, Agent, or Firm—Edwin E. Greigg

[57] ABSTRACT

A hydraulic brake booster including, master brake cylinder pistons disposed in telescoping fashion in a short housing structure, and a locking piston for the brake pedal actuation is disposed parallel to the master brake cylinder in axial alignment with the travel simulator and a brake valve. A further parallel disposition of an adjusting piston is acted upon by reservoir pressure and in which the master brake cylinder pistons are supported in a slidably displaceable manner.

22 Claims, 1 Drawing Figure

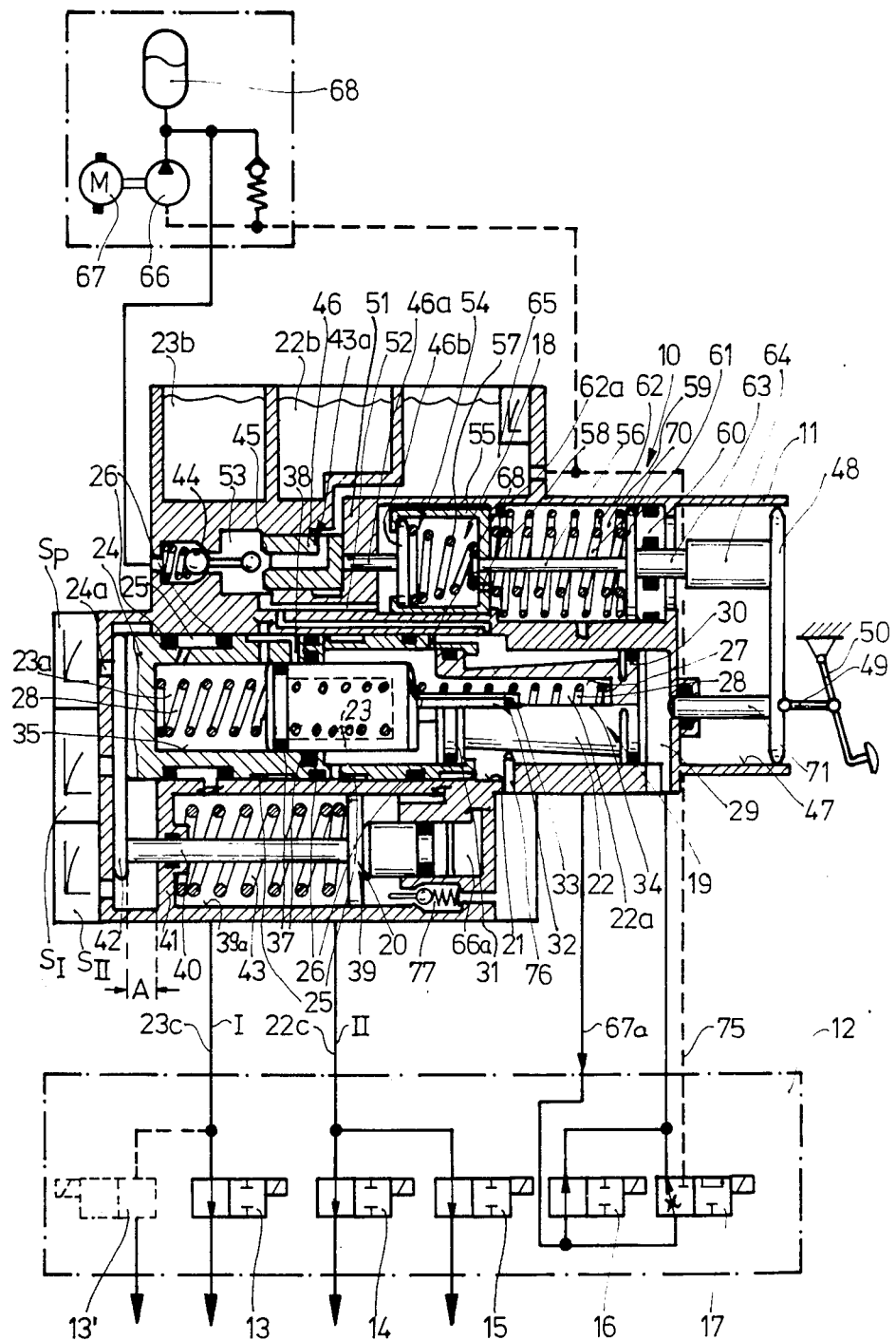

HYDRAULIC BRAKE BOOSTER

BACKGROUND OF THE INVENTION

The invention is based on a hydraulic brake booster as generally defined hereinafter. A known brake booster of this type (German Offenlegungsschrift No. 28 25 087) is additionally equipped with an integrated anti-skid brake system (ABS) such that the brake booster can perform a dual function, namely that of brake boosting as well as that of modulating pressure for the anti-skid function. For pressure modulation, a separate valve circuit is used in combination with a specialized brake booster design, in which the master cylinder of the brake booster is utilized for pressure modulation.

Systems are also known (German Offenlegungsschrift No. 32 37 959) which operate on the principle of feeding pressure directly from the pressure medium supply system.

Typically, brake boosters are embodied such that a plurality of master brake cylinder pistons, each serving separate brake circuits I, II, III, and so on, are disposed in a housing of a brake booster, usually in line one after the other; as a result, the structural length of this kind of tandem brake booster can become considerable, especially if still further components are included in an axial arrangement, such as a pedal plate actuated by the pedal tappet and having its own spring biasing means, and the like.

It is true that an advantageously short structural length can be attained in a tandem brake booster by disposing the master brake cylinder pistons that are associated with the various brake circuits parallel to one another and preferably parallel to the brake valve as well; however, in this kind of twin design, there may be the disadvantage of considerably higher expense for components and seals, especially if the master brake cylinder pistons themselves are also supported in displaceable sheaths or bushings (this will be mentioned again later herein), which makes it possible to avoid pedal drop in the event that the pressure medium supply should fail.

OBJECT AND SUMMARY OF THE INVENTION

It is accordingly the principal object of the present invention to provide a short structural length such as is typical of twin brake boosters, while decisively reducing the structural expense and the required number of seals and components.

This object is attained in accordance with the invention as provided herein and the structure revealed has the advantage over the prior art that on the one hand a short structure is assured by means of master brake cylinder pistons disposed axially in line but also nested one inside the other, that is, in telescoping fashion, each piston having internal bores for receiving restoring springs, while on the other hand considerably fewer parts and seals are needed, especially because the two master brake cylinder pistons are supported in a slidingly displaceable manner within the same adjusting sheath, which thus acts as the master brake cylinder for both master brake cylinder pistons.

The present invention also proposes that a socalled locking piston be disposed parallel to the master brake cylinder pistons, for defining the maximum possible brake pedal travel while the pressure medium supply is intact, and in a particularly advantageous embodiment, which itself has independently inventive quality, the associated pressure chamber of the locking piston is combined with the space in which the travel simulator is installed.

Further advantages of the invention are attainable and as an example there is the possibility, presented by the axial arrangement of the master brake cylinder pistons in common in a single adjusting sheath, of combining these components in a pre-assembled assembly unit with the further advantage that on the one hand, wear-resistant material can be used for the sheath, which assures considerable reliability on the part of the master brake cylinder seals, while on the other hand, the brake booster housing can be embodied as a simple die cast part.

A further advantage is that the restoring springs, too, can be located in the area of the travel simulator and locking piston, in spaces supplied with pressure medium, so that virtually no externally located springs require special anti-corrosion protection.

By means of an arbitrary selection of the diameter of the brake-pedal-actuated tappet, which if the pressure medium supply should fail acts upon the first master brake cylinder piston by mechanical pressure to enable emergency braking, the restoring force exerted on the brake pedal in the event of ABS functions can be variously embodied, in other words, it can be different depending on circumstances.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing, in typical cross-sectional form, shows a tandem brake booster having master brake cylinder pistons which are displaceable within one another in telescoping fashion and are supported in an adjusting sheath which is itself displaceable, the pistons being intended in this case for two independent brake circuits I and II, which are both closed brake circuits.

DESCRIPTION OF THE PREFERRED EMBODIMENT

A first master brake cylinder 22 and adjacent to it a second master brake cylinder 23, as viewed from the direction of brake pedal actuation, are supported in a slidably displaceable manner axially in line with one another in a bore 21 which is offset at the transition to the front rod piston; in this exemplary embodiment, this is the middle or central bore in the brake booster housing 11. The pressure chambers 22a and 23a associated with these cylinders are also shown in the bore 21; they communicate via conduits in the housing, which may be merely suggested in the drawing, with associated pressure medium containers 22b, 23b in the upper portion (in the plane of the drawing) of the brake booster housing 10 and simultaneously act upon the brake pressure outlet lines 22c, 23c which in this case lead to the two brake circuits I and II. The two master brake cylinder pistons 22 and 23 themselves are also slidably displaceable in an adjusting sheath 24, which is axially movable with a predetermined stroke A within the bore 21 of the housing 11, and the respective end stops of the sheath 24, because of its axial mobility, are dependent upon whether the pressure medium supply system is intact or not. In any case, in the vicinity of recesses in the housing, the sheath has radial openings which communicate with the housing recesses over the entire stroke of the sheath, or conversely, the sheath has annular recesses which over the stroke of the sheath communicate with radial conduits in the housing. Such radial conduits, housing recesses, annular recesses and the like are all indicated here by reference numeral 25, and they need not be described in detail, because one skilled in the art will readily understand the significance of the design revealed herein. Wherever the housing recesses or transverse conduits include pressure outlets, ring seals 26 are advantageously provided on both sides; if these ring seals are not located in their own annular grooves but are instead disposed on the face end in respecting annular recesses, then they can be provided with additional axial securing means as well.

An essential inventive characteristic in the association of the master brake cylinder pistons 22, 23 is that these pistons themselves have bores 27, which serve to receive restoring springs 28; as a result, and because of the telescoping arrangement of the two master brake cylinder pistons to be described below, the short structure mentioned above is attainable.

The primary piston 22, that is, the piston upon which the pressure medium acts first when it is fed in via the brake valve from the primary pressure chamber 29, is simultaneously supported with an annular end flange 30, containing a seal, in the tapered portion of the housing bore 21 and also with a second annular end flange 31 and seal in a widened bore diameter of the adjusting sheath 24; the inner bore 27 receives a sheath-like piston rod extension 32 of the second, inner master brake cylinder piston 23, in which in turn a guide rod 34 of the first piston 22 slides, the guide rod being closed off by a widened plate 33. The widened plate 33 is gripped from behind by an inwardly pointing annular flange on the end of the sheath, so that the two pistons are joined to one another; they are pressed apart by the force of one biasing spring 28, and the end flange 31 of the first piston 22, which is located on the left as seen in the drawing, is gripped from behind by an inwardly pointing annular flange on the end of the adjusting sheath, so that the first piston cannot be pushed out of the adjusting sheath. The second, inner master brake cylinder piston 23 slides in a tapered bore 35 of the adjusting sheath 24; this piston can also be called a "floating piston", and with the adjusting sheath 24 it forms a seal assembly comprising a so-called bore and rod seal. In the drawing, both these seals are indicated by reference numeral 37; because of the short distance between the two seals, the structural length can be shorter. A bore 38 between the two seals supplies pressure medium, which is required in the event that subsequent relief is needed.

Design of Adjusting Piston and Adjusting Sheath

In the lower half of the brake booster housing 11, an adjusting piston 39 is supported in a housing bore 39a and is acted upon by reservoir pressure as long as the pressure supply system is intact. An extension 40, in the manner of a piston rod, of the adjusting piston 39 penetrates a housing wall 41 in a sealed manner and is joined to the adjusting sheath 24 via a cross-connection actuation member 42, hereinafter the crossadjusting member, so that the adjusting piston, which is under the influence of a strong biasing spring 43, determines the axial stop position of the adjusting sheath 24.

Design of the Area of the Brake Valve, Travel Simulator and Locking Piston

The brake valve 43a includes two ball valves 44, 45, which are actuated by a stepped piston 46. There is a continuous connection, partially realizable by spring pressure, between the brake valve 43a and a brake pressure plate 48 supported in a housing guideway 47 and connected to the brake pedal 50 via an intermediate tappet 49.

The piston rod 46a of the stepped piston 46 for actuating the double-ball valve assembly extends through a transverse housing wall 51, and a separate connecting conduit 52 is also disposed between the chamber 53 to which the pressure of the pressure medium supply system is first fed upon actuation of the brake valve via the brake pedal, and the pressure chamber 53a located in the vicinity of the travel simulator 54. In the vicinity of the travel simulator 54, the piston rod 46a of the actuating piston 46 for the brake valve 43a widens into a plate and is gripped from behind by a pressure sheath 55; like the actuating tappet 56 which passes centrally through the pressure sheath 55 and acts upon the pressure plate 46b of the piston rod 46a via a conically extending biasing spring 57, the pressure sheath 55 is part of the travel simulator device, which is known per se. The essential feature of the design in this area is that via a connecting conduit 58, the reservoir pressure also reaches the pressure chamber 59 for the locking piston 60, which is therefore combined in this respect with the structural space for the travel simulator; as a result, the biasing spring 62 which at one end acts upon the plate 61 of the tappet 56 and at the other is supported in a stationary manner at point 62a, is surrounded by pressure medium. At the same time, this biasing spring also biases the locking piston 60, because the plate 61 rests on the inner end of this piston and is connected to or rests on a further partial tappet 63, which passes in a sealed manner through the locking piston 60 and merges with a widened stop part 64. As a result, a maximum stroke limitation for the brake pedal 50 when the pressure supply is intact is attained, since whenever the widened tappet region 64 strikes against the locking piston 60, the locking piston prevents the pressure plate 48 from moving farther inward, because the locking piston is itself being acted upon by the high reservoir pressure.

The basic function when the pressure medium supply system is intact is accordingly as follows. The pressure medium supply system includes a pump 66, an electric motor 67 driving the pump, and a pressure medium reservoir 68. Structural components of the brake booster that have not yet been mentioned will be addressed in the following explanation of the operation of the system.

Mode of Operation with Intact Pressure Supply (Without ABS)

Via the elements 48, 64, 63, 61, 56, 55 and the actuating piston 46, a movement of the brake pedal 50 initially causes the closure of the return line to the pressure medium container 65 by means of the ball valve 45, and upon a short further movement of the actuating piston 46 causes the opening of the ball valve 44 and the feeding in of the full reservoir pressure, which via the connecting conduit 51 reaches the area of the travel simulator 54 and enters both the pressure chamber 59 for the locking piston and, via corresponding connecting conduits, the pressure chamber 66a of the adjusting piston 39. The adjusting piston 39, thus acted upon by reservoir pressure, biases the biasing spring 43 and via the cross-adjusting member 42 moves the adjusting sheath 24, against its stop and which supports the master brake cylinder pistons 22, 23, or in other words toward the left in the plane of the drawing. Via a tappet 24a, a pressure transducer Sp for the reservoir pressure is connected to the adjusting sheath 24, and its switching signal is evaluated for switching on the pump 66 of the pressure medium supply system. The restoring biasing spring 43 in the area of the adjusting piston is dimensioned correspondingly.

Via the pressure line 67a and the two valves 16 and 17 which initially remain in the position shown, the reservoir pressure fed in by means of the brake valve actuation simultaneously reaches the primary pressure chamber 29 for the master brake cylinder piston actuation via pressure line 67b. The result, in the conventional manner, is a displacement of the first master brake cylinder piston or rod piston 22 toward the left in the plane of the drawing, causing the pressure medium inflow conduit 38 in the housing to be closed and enabling the resultant brake pressure in the brake circuit II to reach the corresponding wheel brake cylinders, via the ABS valves 14 and 15. At the same time, and as a result of the increase in pressure brought about in the pressure chamber 22a, the floating piston 23, acting as the second master brake cylinder piston, is displaced and feeds brake pressure into the brake circuit I and to the corresponding wheel brake cylinders via the associated ABS valve or valves 13, 13'.

Function in the Event of Pressure Medium Supply Failure

The extended tappet 56 is joined to the travel simulator 54 via travel simulator spring 57, which then, in a manner known per se, acts upon the brake valve 43a to displace the actuating piston 46. For safety reasons, the connection of the tappet 56 with the travel simulator 54 is not rigid. The spring 70, which rests at one end on the plate 61 and at the other on the travel simulator sheath 55, is dimensioned for the maximum possible operating pressure, and it can be bypassed in the event of a malfunction in the brake valve. In that case, then, a master brake cylinder tappet 71, which is secured to the pressure plate or brake plate 48, displaces the master brake cylinder piston, so that emergency braking operation is possible. Since if the pressure supply fails the pressure on the adjusting piston 39 also disappears, the correspondingly large-dimensioned biasing spring 43, which for instance can respond if the pressure falls below a residual pressure of 60 bar, displaces the adjusting sheath 24 toward the right via cross adjusting member 42 in the plane of the drawing, until it meets the stop nearer the housing (stroke A), so that in this case the brake pedal tappet 71 comes to rest in a directly mechanical manner on the first master brake cylinder piston 22, so that the brake pedal 50 can be prevented from a complete inward movement and the pedal characteristic can be maintained.

It is also advantageous, in this brake pedal tappet 71, that the diameter of the brake pedal tappet can be kept arbitrary, so that with larger diameters in the case of ABS functions a corresponding feedback on the brake pedal, from the pressure chamber 29 can be attained when the pressure supply is intact, this feedback being variable as desired. The larger the diameter selected for the brake pedal tappet 71 the greater the feedback force will be that acts upon the pedal tappet in proportion with the pressure variation in the ABS case.

Mode of Operation When ABS Functions Are Initiated

As already noted above, the brake pressure fed in by the brake valve 43a—which can also be called the control valve—reaches the primary side of the master cylinder piston 22 via the valves 16 and 17 of the valve block 12 of the anti-skid brake system. On the secondary side, two 2/2-way magnetic valves 13 (optionally valve 13'), 14 and 15 are incorporated into each of the closed brake circuits I and II. Pressure maintenance functions at the wheel brake cylinders are realized by the magnetic valves 13, 14 and 15 (and if present, the magnetic valve 13'), by their switching over into their blocking position. The communication of the connections on the outlet side of the magnetic valves 13, 13', 14 and 15 with the respective wheel brake cylinders can be effected arbitrarily as well known in the prior art, so this need not be described further.

A pressure reduction during an ABS function is effected via the 3/2-way magnetic valve 17 disposed on the primary side, which in the switched-over position causes the pressure medium to flow out of the primary pressure chamber 29 into the return line 75. The parallel 2/2-way magnetic valve 16 is closed in this case. In the other switching position of the magnetic valve 17, the passageway of this 3/2-way valve is throttled, so that for the ABS case it is also possible to operate with various pressure gradient inclinations.

The design and operation of the hydraulic brake booster according to the invention, having displaceable telescoping master brake cylinder pistons, are made complete by the incorporation of the following components. In addition to the pressure switch Sp for the reservoir pressure, pressure switches SI and SII for monitoring brake circuit status are also provided; they monitor the pressures in the brake circuits I and II. In addition there is a piston position scanning device shown schematically at 76, such as known in the prior art, detects an oblique surface on the first master brake cylinder piston 22 and correlates the piston movement with, for example, corresponding pressure signals of the sensors SI and SII in order to evaluate the brake circuit status and determine the ABS function.

The pressure reaction force during brake pedal actuation is substantially fed back by the tappet 56 and pressure rod assembly 63, 64 using the spring plate 61 the restoring spring 62 acting upon the plate 61 is located in the pressure medium chamber 59 of the locking piston 60 and therefore requires no anti-corrosion protection.

The embodiment of the actuating piston 46 in the brake valve 43a as a stepped piston is a product of the fact that the chamber of the travel simulator, too, experiences the booster pressure, and the piston passes, with a piston-rod-like extension 46a, through a partition, so that the reservoir pressure that is fed in is imposed on that side as well; accordingly, the criterion for the dimensions chosen is the annular surface area of the actuating piston. For the sake of freedom in dimensioning the locking piston 60, the pressure chamber 59 of the travel simulator 54 communicates with the return line via the valve 45; this valve is actuated by the restoring spring 62 via the elements 61, 56, 55, 46b, 46a, and 46, with the result that if there is a failure of the energy supply, no counterpressure will rise in the travel simulator chamber, because the pressure medium can escape to the supply container.

Bordering on the adjusting piston 39, there is also a check valve 77, so that if the pressure supply fails, the spring 43 can push the adjusting sheath 24 against the stop located on the right.

All the characteristics described herein, shown in the drawing, and recited in the following claims can be essential to the invention both singly and in any arbitrary combination with each other.

The foregoing relates to a preferred exemplary embodiment of the invention, it being understood that other variants and embodiments thereof are possible within the spirit and scope of the invention, the latter being defined by the appended claims.

What is claimed and desired to be secure by Letters Patent of the United States is:

1. A hydraulic brake booster for a vehicle brake system, comprising a pressure medium supply system including a motor, a pump and a reservoir, a housing, a brake pedal, a brake pedal-actuated brake valve in said housing for connecting the pressure medium supply system with at least one master brake cylinder piston for at least one brake circuit, at least two master brake cylinder pistons disposed axially in line with one another with a portion of one piston disposed inside the other and disposed in said housing and a brake pedal locking piston beside said master brake cylinder pistons in said housing with its longitudinal axis in parallel relationship with said two master brake cylinder pistons and activated by said brake pedal via a brake pressure plate (48) connected to said brake pedal which actuates said brake pedal locking piston via tappet (63) and widened portion (64).

2. A hydraulic brake booster as defined by claim 1, which includes restoring springs for said master brake cylinder pistons disposed in blind bores in said pistons in which said pistons have closed ends oriented toward an emergency brake tappet (71) coupled with said pedal.

3. A hydraulic brake booster as defined by claim 1, which includes at least one travel transducer which scans the master brake cylinder piston movement, and pressure switches SI, SII which detect various pressures in the brake circuits (I, II), for determining brake circuit status and for evaluating ABS functions.

4. A hydraulic brake booster for a vehicle brake system, comprising a pressure medium supply system including a motor, a pump and a reservoir, a housing, a brake pedal, a brake pedal-actuated brake valve in said housing for connecting the pressure medium supply with at least one master brake cylinder piston for at lesat one brake circuit, at least two master brake cylinder pistons disposed axially in line with one another with a portion of one piston disposed inside another and disposed in said housing and an adjusting piston beside said master brake cylinder pistons in said housing with its longitudinal axis in parallel relationship with said two master brake cylinder pistons and acted upon by reservoir pressure, an adjusting sheath (24) in alignment with said at lest two master brake cylinder pistons, a biasing spring (43) which influences said adjusting piston and a cross adjusting member (42) secured to said adjusting sheath and an extension (40) of said adjusting piston which determines an axial stop position of said adjusting sheath (24).

5. A hydraulic brake booster for a vehicle brake system, comprising a pressure medium supply system including a motor, a pump and a reservoir, a brake pedal-actuated brake valve for connecting the pressure medium supply system with at least one master brake cylinder piston for at lesat one brake circuit, at least two master brake cylinder pistons disposed axially in line with one another with a portion of one piston inside another, a brake pedal and a brake pedal tappet which actuates said brake cylinder pistons, a travel simulator chamber in said housing, a restoring spring for the brake pedal tappet actuation, and a brake pedal locking piston disposed in said travel simulator chamber coaxially with a brake valve and actuated by said brake pedal.

6. A hydraulic brake booster as defined by claim 5, characterized in that for dual utilization of the master brake cylinder pistons for generating brake pressure and for pressure modulation, the reservoir pressure fed in by said brake valve is supplied to a primary pressure chamber via magnetic valves (16, 17) which are responsible for anti-skid braking (ABS) and are switched in accordance with instances of ABS functions that occur, and include additional ABS magnetic valves (13, 14, 15) incorporated into the outlet brake circuit lines (I, II) in order to generate ABS maintenance functions.

7. A hydraulic brake booster for a vehicle brake system, comprising a pressure medium supply system including a motor, a pump and a reservoir, a housing, a brake pedal, a brake pedal-actuated brake valve in said housing for connecting the pressure medium supply system with at least one master brake cylinder piston for at least one brake circuit, at least two master brake cylinder pistons disposed axially in line with one another, each of said at least two master brake cylinder pistons including bores therein with a portion of one piston disposed inside the other and disposed in said housing, restoring springs disposed in said bores in said at lest two master brake cylinder pistons, and a brake pedal locking piston beside said master brake cylinder pistons in said housing with its longitudinal axis in parallel relationship with said two master brake cylinder pistons and activated by said brake pedal, an adjusting sheath which is slidably displaceably supported in a housing bore and said master brake cylinder pistons are guided in a slidably displaceable manner in said adjusting sheath, said adjusting sheath is acted upon, in a direction toward the action exerted on a first brake pedal tappet, by a springdependent adjusting force, and in the opposite direction thereto by a restoring force exerted by an adjusting piston.

8. A hydraulic brake booster as defined by claim 7, in which via a piston-rod-like extension, said adjusting piston is acted upon by the reservoir pressure fed in via said brake valve and includes a second piston-rod-like extension which actuates a cross-adjusting member which is secured at its end to said adjusting sheath in order to axially displace said adjusting sheath.

9. A hydraulic brake booster as defined by claim 8, which includes a pressure switch (Sp) for triggering the pressure medium supply system, a cross member tappet on the cross member which actuates said pressure switch in which said cross member is biased by a spring which acts upon said adjusting piston.

10. A hydraulic brake booster as defined by claim 9, which includes an actuation plate moved by the brake pedal, said first brake pedal tappet disposed on said actuation plate and which is insertable into the primary pressure chamber of the master brake cylinder, a second brake pedal tappet disposed in parallel with said first brake pedal tappet which passes through a locking piston and rests with a thickened shoulder, after traveling a predetermined length, on said locking piston, wherein said second brake pedal tappet acts upon a spring plate of a brake valve actuating tappet, upon which said spring plate the restoring spring, is disposed in a travel simulator chamber.

11. A hydraulic brake booster as defined by claim 8, which includes an actuation plate moved by said brake pedal, said first brake pedal tappet disposed on said actuation plate and which is insertable into the primary pressure chamber of the master brake cylinder, a second brake pedal tappet disposed in parallel with said first brake pedal tappet which passes through said locking piston and rests with a thickened shoulder, after traveling a predetermined length, on said locking piston, wherein said second brake pedal tappet acts upon a spring plate of a brake valve actuating tappet, upon which said spring plate the restoring spring, is disposed in a travel simulator chamber.

12. A hydraulic brake booster for a vehicle brake system, comprising a pressure medium supply system including a motor, a pump and a reservoir, a housing, a brake pedal, a brake pedal-actuated brake valve in said housing for connecting the pressure medium supply system with at least one master brake cylinder piston for at least one brake circuit, at least two master brake cylinder pistons (22, 23) disposed axially in line with one another with a portion of one piston disposed in side another and disposed in said housing and an adjusting piston (39) beside said master brake cylinder pistons in said housing with its longitudinal axis in parallel relationship with said two master brake cylinder pistons and acted upon by reservoir pressure, an adjusting sheath which is slidably displaceably supported in a housing bore and said master brake cylinder pistons are guided in a slidably displaceable manner in said adjusting sheath, said adjusting sheath is acted upon, in a dirction toward the action exerted on a first brake pedal tappet, by a spring-dependent adjusting force, and in the opposite direction thereto by a restoring force exerted by said adjusting piston.

13. A hydraulic brake booster as defined by claim 12, in which via a piston-rod-like extension, said adjusting piston is acted upon by the reservoir pressure fed in via said brake valve and includes a second piston-rod-like extension which actuates a cross-adjusting member which is second at its end to said adjusting sheath in order to axially displace said adjusting sheath.

14. A hydraulic brake booster as defined by claim 13, which includes a pressure switch (Sp) for triggering the pressure medium supply system, a cross member tappet on the cross member which actuates said pressure switch in which said cross member is biased by a spring which acts upon said adjusting piston.

15. A hydraulic brake booster as defined by claim 14, which includes an actuation plate moved by the brake pedal, said first brake pedal tappet disposed on said actuation plate and which is insetable into the primary pressure chamber of the master brake cylinder, a second brake pedal tappet disposed in parallel with said first brake pedal tappet which passes through a locking piston and rests with a thickened shoulder, after traveling a predetermined length, on said locking piston, wherein said second brake pedal tappet acts upon a spring plate of a brake valve actuating tappet, upon which said spring plate the restoring spring, is disposed in a travel simulator chamber.

16. A hydraulic brake booster as defined by claim 13, which includes an actuation plate moved by the brake pedal, said first brake pedal tappet disposed on said actuation plate and which is insertable into the primary pressure chamber of the master brake cylinder, a second brake pedal tappet disposed in parallel with said first brake pedal tappet which passes through a locking piston and rests with a thickened shoulder, after traveling a predetermined length, on said locking piston, wherein said second brake pedal tappet acts upon a spring plate of a brake valve actuating tappet, upon which said spring plate the restoring spring, in disposed in a travel simulator chamber.

17. A hydraulic brake booster as defined by claim 13, in which said brake valve is diposed coaxially with the pedal locking piston and includes a first ball seat valve, which is actuated by a stepped piston which is displaced via said travel simulator device by a brake valve tappet passing through said pedal locking piston, and a second ball valve which together with said first ball valve forms a double-ball valve and upon the movement of said stepped piston closes a central return flow conduit in said brake valve.

18. A hydraulic brake booster as defined by claim 17, in which a connecting conduit is provided from a chamber that is acted directly upon by the reservoir pressure fed in upon the opening of said first ball valve to a rear chamber embodied by a housing bore, in which not only the travel simulator device but also a pressure chamber for the pedal locking piston is provided.

19. A hydraulic brake booster for a vehicle brake system, comprising a pressure medium supply system including a motor, a pump and a reservoir, a housing, a brake pedal, a brake pedal-actuated brake valve in said housing for connecting the pressure medium supply system with at least one master brake cylinder piston for at least one brake circuit, at least two master brake cylinder pistons disposed axially in line with one another with a portion of one piston disposed inside the other and disposed in said housing and a brake pedal locking piston beside said master brake cylinder pistons in said housing with its longitudinal axis in parallel relationship with said two master brake cylinder pistons and activated by said brake pedal, an actuation plate moved by the brake pedal, a first brake pedal tappet disposed on said actuation plate and which is insertable into the primary pressure chamber of the master brake cylinder, a second brake pedal tappet disposed in parallel with said first brake pedal tappet which passes through a locking piston and rests with a thickened shoulder, after traveling a predetermined length, on said locking piston, wherein said second brake pedal tappet acts upon a spring plate of a brake valve actuating tappet, upon which said spring plate the restoring spring, is disposed in a travel simulator chamber.

20. A hydraulic brake booster for a vehicle brake system, comprising a pressure medium supply system including a motor, a pump and a reservoir, a housing, a brake pedal, a brake pedal-actuated brake valve in said housing for connecting the pressure medium supply system with at least one master brake cylinder piston for at least one brake circuit, first and second master brake cylinder pistons disposed axially in line with one another with a portion of said second master brake cylinder piston disposed inside said first master brake cylinder piston and disposed in said housing and a brake pedal locking piston beside said master brake cylinder pistons in said housing with its longitudinal axis in parallel relationship with said two master brake cylinder pistons and activated by said brake pedal, said second master brake cylinder piston includes a sheath-like extension embodied as a floating piston which engages an inner bore of said first master brake cylinder piston and is embodied as a rod piston, wherein the sheath-like extension is itself engaged on the inside by a rod part beginning at the first master brake cylinder piston and provided with a widened head, and that both said rod piston and said widened head are surrounded by a first biasing spring between said first and second master brake cylinder pistons.

21. A hydraulic brake booster for a vehicle brake system, comprising a pressure medium supply system including a motor, a pump and a reservoir, a housing, a brake pedal, a brake pedal-actuated brake valve in said housing for connecting the pressure medium supply system with at least one master brake cylinder piston for at least one brake circuit, first and second master brake cylinder pistons, said second master brake cylinder piston disposed axially in line with said first master brake cylinder piston with a portion of said second master brake cylinder piston disposed inside said first master brake cylinder piston and disposed in said housing and an adjusting piston (39) beside said master brake cylinder pistons in said housing with its longitudinal axis in parallel relationship with said first and second master brake cylinder pistons and acted upon by reservoir pressure, said second master brake cylinder piston includes a sheath-like extension embodied as a floating piston which engages an inner bore of said first master brake cylinder piston and is embodied as a rod piston, wherein the sheath-like extension is itself engaged on the inside by a rod part beginning at the first msater brake cylinder piston and provided with a widened head, and that both said rod piston and said widened head are surrounding by a first biaing spring between said first and second master brake cylinder pistons.

22. A hydraulic brake booster for a vehicle brake system, comprising a pressure medium supply system including a motor, a pump and a reservoir, a housing, a brake pedal-actuated brake valve for connecting the pressure medium supply system with at least one master brake cylinder piston for at least one brake circuit, first and second master brake cylinder pistons (22, 23), said second master brake cylinder piston disposed axially in line with said first master brake cylinder piston with a portion of said second master brake cylinder piston inside said first master brake cylinder piston, a brake pedal and a brake pedal tappet which actuates said brake cylinder pistons, a travel simulator chamber in said housing, a restoring spring for the brake pedal tappet actuation, and a brake pedal locking piston disposed in said travel simulator chamber coaxially with a brake valve and actuated by said brake pedal, said second master brake cylinder piston includes a sheath-like extension embodied as a floating piston which engages an inner bore of said first master brake cylinder piston and is embodied as a rod piston, wherein the sheath-like extension is itself engaged on the inside by a rod part beginning at the first master brake cylinder piston and provided with a widened head, and that both said rod piston and said widened head are surrounded by a first biasing spring between said first and second master brake cylinder pistons.

* * * * *